April 23, 1963
J. L. E. POMOT ET AL
3,086,987
PRODUCTION OF CARBAMIC ESTERS
Filed Jan. 29, 1960
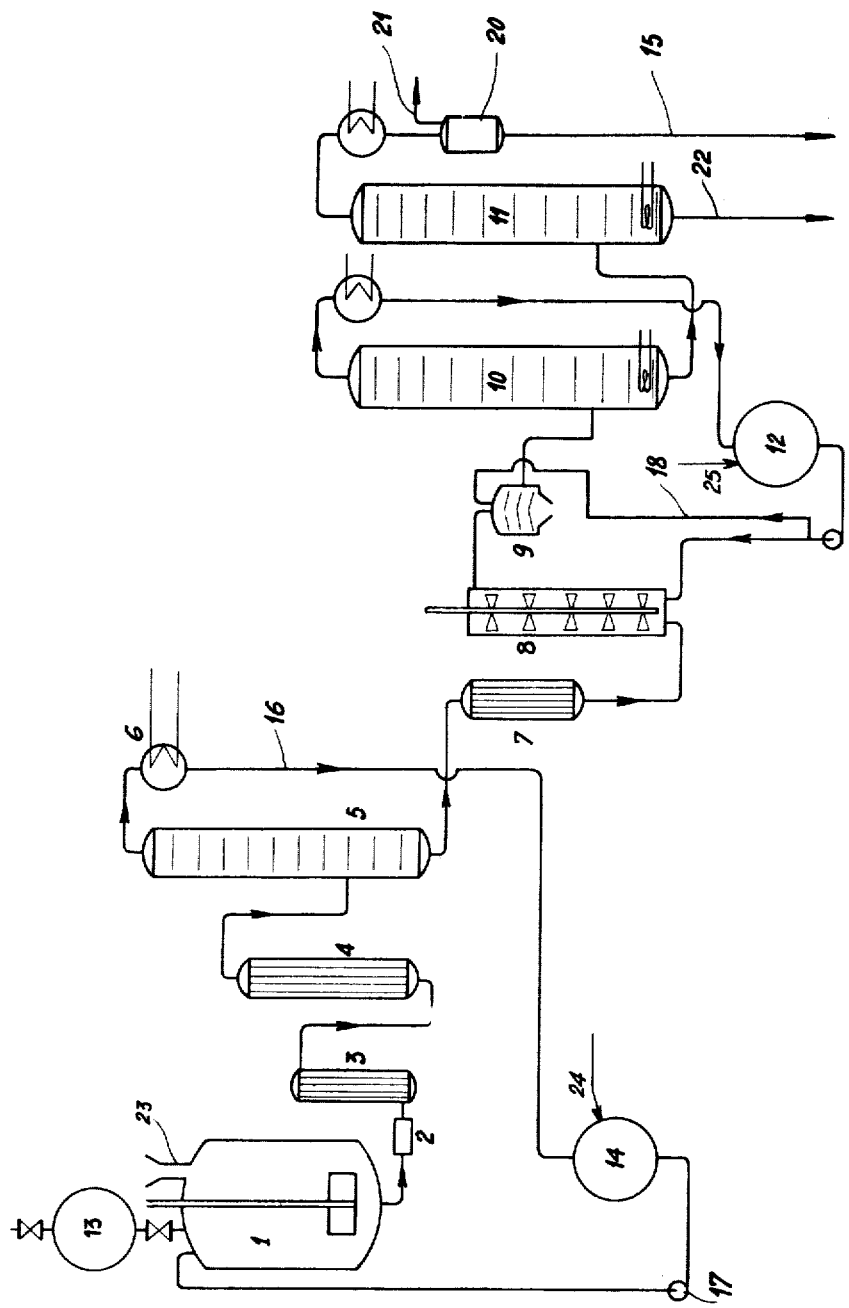
INVENTORS
Jean L. E. Pomot
Emanuel J. F. Luzarreta
Gilbert G. J. Cousserans
By Stevens, Davis, Miller & Mosher
ATTORNEYS United States Patent Office 3,086,987
Patented Apr. 23, 1963

3,086,987
PRODUCTION OF CARBAMIC ESTERS
Jean Louis Emile Pomot, Neuilly, and Emmanuel Jean Francois Luzarreta and Gilbert Guy Justin Cousserans, Toulouse, France, assignors to Office National Industriel de l'Azote, Toulouse, France, a body corporate of France
Filed Jan. 29, 1960, Ser. No. 5,385
9 Claims. (Cl. 260—482)

This invention relates to the production of carbamic esters.

It is known that one of the most economic methods of preparing esters of carbamic acid (urethanes) is to heat urea with an excess of the corresponding alcohol at a sufficiently high temperature. The reaction takes place with elimination of gaseous ammonia and consequently it is practicable only with alcohols having a boiling point of at least 110° C. The acohol is then condensed and the ammonia formed in the reaction is continuously eliminated. This reaction is somewhat prolonged. For example, in the preparation of n-butylcarbamate at the boiling temperature of n-butanol (117.7° C.) a yield of 75%, calculated on the urea employed, is obtained only after heating for 30 hours under reflux.

It is also known that some oxides of heavy metals employed as catalysts increase the yields of the reaction of urea with an alcohol. For example, the use of zinc oxide is mentioned in French Patent No. 896,223. Thus it is possible to prepare o-methylcyclohexanol carbamate in a mean yield of 80-85% by heating an excess of o-methylcyclohexanol wtih urea for 10 hours at 120° C. in the presence of a solvent and 4% of zinc oxide calculated on the urea employed.

It is also known, in the preparation of carbamic acid esters, to substitute for the urea a urea salt, more especially urea nitrate, so as to combine the ammonia within the reaction medium in the form of a salt, more especially ammonium nitrate. For example, if a mixture of urea nitrate in four times the theoretical quantity of ethanol is heated for 5 hours under pressure and at a temperature of 135-140° C. in order to form ethyl carbamate, this compound is obtained in a yield of 70-80% calculated on the urea nitrate employed. On the other hand, if the operation is carried out with the same reactants and at the same temperature, the duration of the heating is reduced, but the ethyl carbamate yields decrease considerably. Thus, for example, at a temperature of 135° C., the yield after reaction for 1 hour is only 73%, after reaction for half an hour is only 70%, and after reaction for a quarter of an hour is only 49%. At a temperature of 140° C., the yield after heating for a quarter of an hour is only 51%.

Hence all the processes hitherto employed to prepare, in acceptable industrial yields, carbamic esters of monoalcohols, notably of lower aliphatic monoalcohols, such as methanol, ethanol and propanol, from these alcohols and from urea, or from these alcohols and urea salts, notably the nitrate, in the presence or absence of oxides or salts of heavy metals, require relatively long reaction periods reaching several hours at reaction temperatures between 110° and 160° C. These relatively long reaction periods have made it necessary to operate these processes in discontinuous installations, since it has not been possible to carry out the industrial preparation of these esters with such processes in an economic manner in a continuously operating apparatus.

It is an object of the present invention to provide a process for the production of carbamic esters whereby yields of the order of 80% or more can be obtained in a reaction period between 10 minutes and half an hour, this period being a function of the reaction temperature.

According to the present invention there is provided a process for the production of carbamic esters which comprises reacting urea nitrate with a stoichiometric excess of a monohydric alcohol in the presence of zinc oxide as catalyst.

It has surprisingly been found that whereas when urea is reacted with an excess of alcohol in the presence of a zinc salt, such as the acetate or the chloride, as proposed in the literature, the carbamic ester yields are improved but the reaction periods are not shortened, yet when the reaction is effected between urea nitrate and the alcohol in the presence of zinc oxide, the reaction periods for obtaining a given yield at a given reaction temperature are reduced at least to a twentieth of those previously necessary. For example, for the preparation of benzyl carbamate from urea and benzyl alcohol, in the presence of 6% of zinc acetate calculated on the urea, the time necessary for obtaining yields greater than 80% at a temperature of 140° C. is at least 8 hours. On the other hand, if urea nitrate is reacted with benzyl alcohol under the same conditions at 140° C. in the presence of 5.5% of zinc oxide calculated on the urea, a yield of 80.7% is obtained in 15 minutes.

The present invention is applicable to the preparation of carbamic esters of all aliphatic, cycloaliphatic and araliphatic monoalcohols for example any of the following: methanol, ethanol, propargyl alcohol, allyl alcohol, propanol, isopropanol, 2-methoxyethanol, crotonyl alcohol, cyclobutanol, cyclopropylcarbinol, vinylethyl alcohol, n-, iso-, secondary-, and tertiary-butyl alcohols, cyclopentanol, methylallylcarbinol, vinylethylcarbinol, 2-pentane-4-ol, methyl-cyclopropylcarbinol, cyclobutylcarbinol, the various isomeric amyl alcohols, diethylcarbinol, methylisopropylcarbinol, dimethylpropenylcarbinol, t-amylcarbinol, dimethyl - isopropylcarbinol, ethylpropylcarbinol, ethyl-isopropylcarbinol, methylbutylcarbinol, methyl-s-butylcarbinol, pinacolyl alcohol, methyldiethylcarbinol, 2-methyl-2-propylethylol, dimethyl-isobutylcarbinol, dimethyl - t - butylcarbinol, diisopropylcarbinol, ethyl - isobutylcarbinol, ethyl-s-butylcarbinol, dimethylbutylcarbinol, methyl-isoamylcarbinol, methylethylpropylcarbinol, methylethyl-isopropylcarbinol, propyl-isopropylcarbinol, triethylcarbinol, benzyl alcohol, phenylethyl alcohol and naphthylmethyl alcohol. Depending upon the boiling point of the acohol employed, the operation is more conveniently carried out under superatmospheric pressure or at atmospheric pressure. The alcohol is preferably employed in the anhydrous or substantially anhydrous state, since otherwise the carbamate yield tends to be reduced.

As indicated above there should be present an excess of the alcohol over the urea. The molecular ratio of alcohol to urea may vary for example from 2 to 10 and is most advantageously between 5 and 8. The proportion of zinc oxide employed may vary for example, from 1% to 10% calculated on the urea, the most advantageous results being obtained with a proportion of from 5% to 6% of zinc oxide calculated on the urea.

The reaction temperatures employed are preferably between 130° and 150° C., the best results being obtained at temperatures in the neighbourhood of 140° C.

In carrying out the process of the present invention there may be employed, as starting materials, previously prepared urea nitrate and the selected alcohol, these being mixed together. However it has been found to be generally advantageous, and therefore preferred, to form the urea nitrate in situ by using, as starting materials, urea, concentrated nitric acid and the selected alcohol. Thus, the urea nitrate may be prepared in situ by slowly introducing the stoichiometric quantity of nitric acid, e.g. in a concentration of 96–98%, into a vigorously agitated and cooled mixture of urea and the alcohol. Provided the temperature is kept below 30° C. the urea nitrate may then be formed without danger. The formation of the nitrate of the alcohol employed is completely negligible under these conditions and there is directly obtained a suspension of urea nitrate in the corresponding alcohol, which serves for directly feeding the reaction vessel.

Whilst, as indicated above, the invention is generally applicable to the production of carbamic esters from all monoalcohols of the aliphatic, cycloaliphatic and araliphatic series, the invention is of principal importance, from the industrial standpoint, in the preparation of carbamic esters from such monalcohols which have boiling points not exceeding 150° C. since this is the upper temperature limit for carrying out the invention if optimum results are to be otbained and any excess of alcohol may be separated from the reaction mixture by distillation without serious risk of decomposition of the carbamic ester produced. Moreover, the risk of the formation of resins by secondary oxidation reactions, which limits the yield when alcohols of high molecular weight are employed, is obviated. The process is of especial value in the preparation of carbamic esters from monoalcohols containing from 1 to 6 carbon atoms.

The carbamic esters obtained, and more especially methyl carbamate, may be employed, as starting materials for the preparation of carbamates of higher molecular weight, by transesterification reactions employing the corresponding high alcohols. A practical method of carrying out the process of the present invention will now be described with reference to the accompanying drawing. The drawing is purely diagrammatic and it will be understood that while the component parts of the apparatus have been shown side by side or separately, they need not be in this form for industrial practice. Furthermore ancillary apparatus, such as means for heat recovery, have been omitted to simplify the drawing. For convenience of description specific reactants are mentioned in reference to the drawing but it is to be understood that the reactants may be varied within the scope of the invention.

Referring to the drawing, ethyl alcohol (fed from a storage tank 14 by a pump 17) is introduced into a mixer 1 provided with a cooling coil in which there flows a cooling fluid, urea and zinc oxide are added through the neck 23 with vigorous agitation, and 98% nitric acid (coming from the tank 13) in a quantity corresponding to the urea is slowly added in such manner as not to exceed a temperature of 30° C. in the mixer 1. The agitated mixture serves to maintain a constant supply to a reactor 4 through a controlled-feed pump 2 and a heater 3. The mixture is heated to 140° C. in the preheater and the delivery of the feed pump is so adjusted that the period for which the mixture remains in the reactor 4 is about 15 minutes, the pressure in the reactor being 17 kg. per cm². The mixture is thereafter continuously expanded in a bundle of tubes 5, in which the excess of alcohol is evaporated, condensed in a condenser 6 and returned to the feed system (pipe 16, storage tank 14 receiving fresh alcohol through line 24, and pump 17). There is collected at the bottom of the tube bundle 5 an ammonium nitrate solution in crude ethyl carbamate. This solution is cooled to 90° C. by a heat exchanger 7 and is continuously fed to a crystalliser 8, into which cold dichloroethane is simultaneously admitted from a tank 12 into which it is fed through line 25. This admission of dichloroethane, which may be replaced by other non-polar solvents such as chloroform or toluene, effects the separation of the ammonium nitrate in the form of fine crystals in the crystalliser 8. The solution of crude ethyl carbamate containing ammonium nitrate crystals in suspension is directed to a continuously operating centrifuge 9, in which the nitrate is separated and washed by an additional admission of solvent fed through the pipe 18. The solution of crude ethyl carbamate in the solvent is fed through a pump to a distillation column 10, in which the solvent is distilled, condensed at the top and returned in the liquid state into the tank 12. The crude ethyl carbamate is fed to a vacuum distillation column 11 and leaves the top of this column in purified, vapour form. After condensation at a temperature above the solidifying point and after passing through an intermediate vessel 20 communicating with the vacuum pump through 21, the pure ethyl carbamate is withdrawn at 15 and can then be brought into commercial form (e.g. crystals or flakes) by various known processes. At the base of the column 11, heavy products containing zinc oxide are wtihdrawn via line 22.

The following examples will serve to illustrate the invention:

*Example I*

60 g. of urea are mixed with 360 cc. of absolute ethanol; 3 g. of powdered zinc oxide are added to the vigorously agitated mixture. 69 g. of nitric acid containing 98% of HNO₃ are then slowly poured into the mixture, temperature being maintained at a value of 15–20° C.

The mixture is introduced into an autoclave, agitated and rapidly brought to 140° C., the pressure being 17 atmospheres. This temperature is maintained for 15 minutes, the product is then cooled and the excess of alcohol is driven off by distillation. To the well agitated reaction product are added in one lot 170 cc. of cold dichloroethane, and the temperature of the mixture is maintained at 40–45° C. for 15 minutes. The ammonium nitrate crystallises. The product is filtered and washed on the filter with 35 to 40 cc. of dichloroethane.

The dichloroethane is driven off from the filtrate by distillation and the crude ethyl carbamate is distilled under a pressure of 20 mm. Hg. There are obtained 71.8 g. of pure ethyl carbamate, M.P. 48° C. The yield calculated on the urea is 80.7%.

*Example II*

60 g. of urea and 400 g. of isopropanol are mixed, and 3 g. of finely divided zinc oxide are added to the vigorously agitated mixture. 69 g. of nitric acid containing 98% of HNO₃ are then slowly poured in, the temperature being maintained at 10–20° C.

This mixture is introduced into the autoclave and rapidly brought to 140° C. with agitation. This temperature is maintained for 15 minutes, the mixture is cooled and the excess of isopropanol is driven off. 150 cc. of toluene are rapidly added to the crude isopropyl carbamate obtained, which contains the ammonium nitrate in solution, and the temperature of the mixture is maintained at 40–45° C. for 15 minutes. The ammonium nitrate separates from the solution in the form of fine crystals. It is separated by filtration and washed on the filter with 50 cc. of toluene.

The toluene is driven off from the filtrate by distillation and the isopropyl carbamate is distilled under reduced pressure. There are obtained 79.3 g. of pure isopropyl carbamate. The yield calculated on the urea is 77%.

*Example III*

Employing the apparatus diagrammatically illustrated in the accompanying drawing, methyl carbamate is continuously prepared in the following manner:

Into the mixer 1 are introduced:

| | | |
|---|---|---|
| Methanol | litres | 3,700 |
| Urea | kg | 880 |
| Zinc oxide | kg | 27 |

Into this mixture, vigorously agitated and cooled at 15–20° C., there is slowly poured:

| | | |
|---|---|---|
| 98% nitric acid | kg | 1,000 |

This mixture represents the steady supply of the apparatus for 24-hours operation.

The mixture is taken up by the controlled-feed pump 2 and fed under a pressure of 20 atmospheres into the preheater 3 at a rate of 200 litres per hour. The preheater 3 is so adjusted that the mixture enters the reactor 4 at 135–140° C.

The temperature in the reactor 4 is maintained at 140° C. and when the reaction mass has remained in this apparatus for 15 minutes its pressure is reduced to atmospheric pressure in the stripping column 5, in which the unreacted methanol is evaporated, condensed and returned to the storage and supply tank 14.

The crude methyl carbamate containing ammonium nitrate in solution is collected at the bottom of the column 5 and is fed through the heat exchanger 7, which is adjusted to cool the product to 90° C., into the crystalliser 8, into which cold dichloroethane is simultaneously admitted at a rate of 100 litres per hour. The temperature in the crystalliser 8 is maintained at 45° C., and the residence time is 15 minutes.

The crude methyl carbamate solution containing the ammonium nitrate in suspension is directed to a continuously operating centrifuge 9, in which the nitrate is separated and washed by admission of cold dicholoroethane at a rate of 20 litres per hour.

The dichloroethane is evaporated in the column 10 and returned to the storage tank 12.

The crude methyl carbamate leaving the column 10 is fed to a rectification column 11 operating in vacuo. 40 kg. of pure distilled methyl carbamate are collected per hour at 15. The yield calculated on the urea is about 90.%.

We claim:

1. A method for producing a carbamic ester which comprises mixing urea nitrate and an amount of a monohydric alcohol at least one hundred percent in excess of the stoichiometric equivalent of the urea to obtain a reaction mixture, maintaining said reaction mixture in the presence of a catalytic amount of zinc oxide at a temperature in the range of about 130° C. to about 150° C. and at atmospheric pressure for not more than about 0.5 hours, and recovering carbamic ester in amount at least about 80 percent of theory.

2. In the method for producing a carbamic ester as set forth in claim 1 wherein the boiling point of the monohydric alcohol is not greater than about 150° C.

3. In the method for producing a carbamic ester as set forth in claim 1 wherein the monohydric alcohol has not more than six carbon atoms in the molecule.

4. A method for producing a carbamic ester which comprises adding concentrated nitric acid to a mixture of urea and monohydric alcohol whilst maintaining a temperature not greater than about 30° C. to obtain a reaction mixture, maintaining said reaction mixture at a temperature in the range of about 130° C. to about 150° C. in the presence of a catalytic amount of zinc oxide and at least at atmospheric pressure for not more than 0.5 hour, and recovering an amount of carbamic ester at least about 80% of theory, said nitric acid being substantially stoichiometrically equal to the urea and the monohydric alcohol being in substantial excess of the stoichiometric equivalent of the urea.

5. In the method for producing a carbamic ester as set forth in claim 4 wherein the monohydric alcohol has not more than six carbon atoms in the molecule and wherein the catalytic amount of zinc oxide is in the range of about 1 to about 10 percent based upon the urea.

6. In the method for producing a carbamic ester as set forth in claim 4 wherein the monohydric alcohol has not more than six carbon atoms in the molecule, wherein there are about two to about ten mols of monohydric alcohol per mol of urea, and wherein the catalytic amount of zinc oxide is in the range of about 5 to 6 percent based on the urea.

7. In the method for producing a carbamic ester as set forth in claim 4 wherein the monohydric alcohol has a boiling point not greater than about 150° C., wherein there are about 2 to about 10 mols of monohydric alcohol per mol of urea, wherein ammonium nitrate is crystallized and separated in the presence of added non-polar solvent, wherein the non-polar solvent and unreacted alcohol are separated, and wherein carbamic ester is recovered from the residual reaction mixture.

8. A method for continuously producing a carbamic ester which comprises establishing a liquid pool comprising urea and at least a substantial stoichiometric excess of monohydric alcohol having a boiling point not greater than about 150° C., adding to said pool whilst maintaining a temperature therein not greater than about 40° C. a substantially molal equivalent amount of concentrated nitric acid, based upon the urea, to obtain a reaction mixture comprising urea nitrate and said monohydric alcohol, substantially continuously withdrawing a portion of said reaction mixture, heating said withdrawn portion of said reaction mixture as a confined stream to a reaction temperature in the range of about 130° C. to about 150° C., maintaining said heated withdrawn portion of said reaction mixture as a confined stream at least at atmospheric pressure and at said reaction temperature in the presence of about 1 to about 10 percent of zinc oxide, based upon the urea, for not more than 0.5 hour to obtain reacted portion comprising carbamic ester, monohydric alcohol, and ammonium nitrate, crystallizing and separating said ammonium nitrate from said reacted portion in the presence of non-polar solvent, and recovering carbamic ester in at least about 80 percent of the theoretical yield.

9. In the method for continuosuly producing a carbamic ester as set forth in claim 8 wherein the monohydric alcohol is in the ratio of about 2 to about 10 mols per mol of urea, wherein the non-polar solvent is dichloroethane, wherein the dichloroethane is separated by distillation, and wherein the carbamic ester is separated by vacuum distillation.

References Cited in the file of this patent

UNITED STATES PATENTS

| 675,538 | Bonhoeffer | June 4, 1901 |

FOREIGN PATENTS

| 896,223 | France | Feb. 15, 1945 |
| 1,020,017 | Germany | Nov. 28, 1957 |

UNITED STATES PATENT OFFICE
CERTIFICATE OF CORRECTION

Patent No. 3,086,987　　　　　　　　　　　　　　　April 23, 1963

Jean Louis Emile Pomot et al.

It is hereby certified that error appears in the above numbered patent requiring correction and that the said Letters Patent should read as corrected below.

In the heading to the printed specification, between lines 8 and 9, insert the following:
Claims priority, application France Feb. 6, 1959 column 2, line 47, for "acohol" read -- alcohol --; column 3, line 16, for "otbained" read -- obtained --; column 4, line 13, for "wtihdrawn" read -- withdrawn --; column 5, line 40, for "hours" read -- hour --; column 6, line 27, for "40° C." read -- 30° C. --; line 45, for "continuosuly" read -- continuously --.

(SEAL)　Signed and sealed this 3rd day of December 1963.

Attest:

ERNEST W. SWIDER　　　　　　　　　　　　　　　EDWIN L. REYNOLDS
Attesting Officer　　　　　　　　　　　　　Acting Commissioner of Patents